United States Patent
Einarsson et al.

(10) Patent No.: US 10,196,029 B2
(45) Date of Patent: Feb. 5, 2019

(54) COVER ELEMENT FOR AN AIRBAG MODULE, AND AIRBAG MODULE HAVING SUCH A COVER ELEMENT

(71) Applicant: Autoliv Development AB, Vårgårda (SE)

(72) Inventors: Anders Einarsson, Vårgårda (SE); Johan Fritzen, Vårgårda (SE); Jonas Svantesson, Alingsås (SE); Mikael Dahlgren, Alingsås (SE); Stefan Andersson, Alingsås (SE); Carl-Fredrik Anulf, Alingsås (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 52 days.

(21) Appl. No.: 15/511,086

(22) PCT Filed: Sep. 16, 2015

(86) PCT No.: PCT/EP2015/071150
§ 371 (c)(1),
(2) Date: Mar. 14, 2017

(87) PCT Pub. No.: WO2016/042003
PCT Pub. Date: Mar. 24, 2016

(65) Prior Publication Data
US 2017/0259773 A1  Sep. 14, 2017

(30) Foreign Application Priority Data
Sep. 16, 2014  (DE) .................. 10 2014 013 702

(51) Int. Cl.
*B60R 21/203*   (2006.01)
*B60R 21/2165*  (2011.01)
*B60R 21/215*   (2011.01)

(52) U.S. Cl.
CPC .... *B60R 21/21656* (2013.01); *B60R 21/2035* (2013.01); *B60R 21/2165* (2013.01); *B60R 2021/21543* (2013.01)

(58) Field of Classification Search
CPC ................ B60R 2021/21543; B60R 21/21656
See application file for complete search history.

(56) References Cited

U.S. PATENT DOCUMENTS 6,443,483 B2 * 9/2002 Ellerbrok ............ B60R 21/2155
                                                  280/728.3
6,626,458 B2 * 9/2003 Fujita .................... B60Q 1/0082
                                                  280/728.3

(Continued)

FOREIGN PATENT DOCUMENTS

DE    299 22 987 U1    5/2000
EP    2 030 848 A2     3/2009

(Continued)

OTHER PUBLICATIONS

European Patent Office, P.B. 5818 Patentlaan 2, Nl 2280, HV Rijswijk, International Search Report for International Application No. PCT/EP2015/071150, dated Dec. 3, 2015, 6 pages, Form PCT/ISA/210 (Apr. 2005).

(Continued)

*Primary Examiner* — Nicole T Verley
(74) *Attorney, Agent, or Firm* — Brinks Gilson & Lione

(57) ABSTRACT

A cover element (10) for an airbag unit having a stationary section, a first flap (14), and a second flap (20), wherein the first flap (14) is connected to the stationary section by at least one first hinge (31), and the second flap (20) by at least one second hinge (32). The two flaps (14, 20) are connected to each other by a tear connection (35). The first flap (14) has an outer area (16) and an emblem area (18), which protrude at least partially from the outer area (16) and extend into the second flap (20). In order that the emblem area (18) is not (Continued)

in the way of the expanding airbag even if the emblem area (18) is relatively large, the emblem area (18) is connected to the outer area (16) of the first flap (14) by a third hinge (33), so that the emblem area (18) can swing against the outer area (16) when the first flap (14) is open.

7 Claims, 4 Drawing Sheets

(56) References Cited

U.S. PATENT DOCUMENTS

| | | | |
|---|---|---|---|
| 6,672,614 B2 * | 1/2004 | Endo | B60R 21/21656 280/728.3 |
| 7,097,199 B2 * | 8/2006 | Dearden | B60R 21/21656 280/728.3 |
| 7,390,013 B2 * | 6/2008 | Chavez | B60R 21/21656 280/728.3 |
| 7,766,381 B2 * | 8/2010 | Fujimori | B60R 21/21656 280/731 |
| 7,988,189 B2 * | 8/2011 | Hayashi | B60R 21/21656 280/731 |
| 8,465,048 B2 * | 6/2013 | Hayashi | B60R 21/2155 280/728.3 |
| 8,517,415 B2 * | 8/2013 | Iida | B60R 21/237 280/728.3 |
| 8,651,680 B2 * | 2/2014 | Rick | B60R 21/21656 280/731 |
| 9,205,796 B2 * | 12/2015 | Nonoyama | B60R 21/215 |
| 2001/0040362 A1 | 11/2001 | Ellerbrok | |
| 2002/0005631 A1 * | 1/2002 | Varcus | B60R 21/203 280/728.3 |
| 2010/0201105 A1 * | 8/2010 | Iwazato | B60R 21/201 280/728.3 |
| 2012/0242065 A1 | 9/2012 | Hayashi et al. | |

FOREIGN PATENT DOCUMENTS

| | | |
|---|---|---|
| EP | 2 143 595 A1 | 1/2010 |
| EP | 2 216 213 A1 | 8/2010 |

OTHER PUBLICATIONS

German Office Action, Application No. 10 2014 013 702.3, dated May 15, 2015.

* cited by examiner

COVER ELEMENT FOR AN AIRBAG MODULE, AND AIRBAG MODULE HAVING SUCH A COVER ELEMENT

CROSS REFERENCE TO RELATED APPLICATIONS

This application claims priority to German Patent Application No. 10 2014 013 702.3, filed on Sep. 16, 2014 and PCT/EP2015/071150, filed on Sep. 16, 2015.

FIELD OF THE INVENTION

The invention relates in particular to a cover element for a driver front airbag module that is part of a steering wheel. The invention can, however, also be used in passenger front airbag modules that are included in a dashboard or are part of a dashboard. For simplification, the prior art and the subject matter of the invention will, however, be exclusively explained with respect to a driver front airbag module.

BACKGROUND OF THE INVENTION

The top of the cover element of a driver front airbag module usually covers the entire adjacent area of the steering wheel, and here usually has at least two flaps that are retained on a stationary section, which can, for example, be formed by a lateral wall. Such a cover element is usually designated as "cover." Here it is possible that the flaps form the entire top of the cover element, and it is also possible that the flaps are connected to a peripheral area of the roof via tear-away connections. In any case, at least one hinge is associated with each flap, about which hinge the flap can swing into an open position when the airbag is expanding. Furthermore, two adjacent flaps are normally connected to each other by a tear-away connection. If the gas generator of the airbag module is initiated, then the airbag expands, whereby all tear-away connections are opened and the flaps swing open about their respective hinges.

There is the desire on the part of most vehicle manufacturers to dispose the emblem of the vehicle manufacturer in the central hub area of the steering wheel. Thus, at least one of the flaps must have an emblem area that forms the emblem or on which the emblem is disposed, which, in the latter case in particular, can cause problems if the size of the emblem is relatively large. Cover elements have therefore been known in which the tear-away connection extends through the emblem between two adjacent flaps so that the emblem breaks open in the event of an expansion of the airbag. This, however, requires very high manufacturing expense.

On this basis, the object of the present invention is to further develop a cover element of the above-described type so that its manufacturing expense is low and the emblem section, even if it is relatively large, is not in the way of the expanding airbag and remains constrained against traveling uncontrolled in the vehicle interior.

The above object is achieved by a cover element having the features of described herein and shown by the Figures.

SUMMARY OF THE INVENTION

According to the invention, at least one flap; designated as first flap; is configured in at least two parts, including an outer area and an emblem area, where the emblem area is connected to the outer area via a third hinge so that the emblem area can swing against the outer area when the first flap is open. In this way, a tear-away connection running through the emblem can be omitted and the emblem area is still not "in the way" of the expanding airbag because it can be swung out of its deployment path while its movement is constrained.

If exactly two flaps are provided, which frequently is the case, it should at least be preferred that, in the initial state, the emblem area is connected to the outer area of the first flap by another tear-away connection.

Since no tear connection runs through the emblem section, an emblem can be disposed in the emblem area, which allows the emblem to stay intact when the airbag expands so that there is relative freedom in manufacturing this emblem.

BRIEF DESCRIPTION OF THE DRAWINGS

The invention will be now described in more detail on the basis of exemplary embodiments with reference to the Figures.

DETAILED DESCRIPTION

Figure 1:
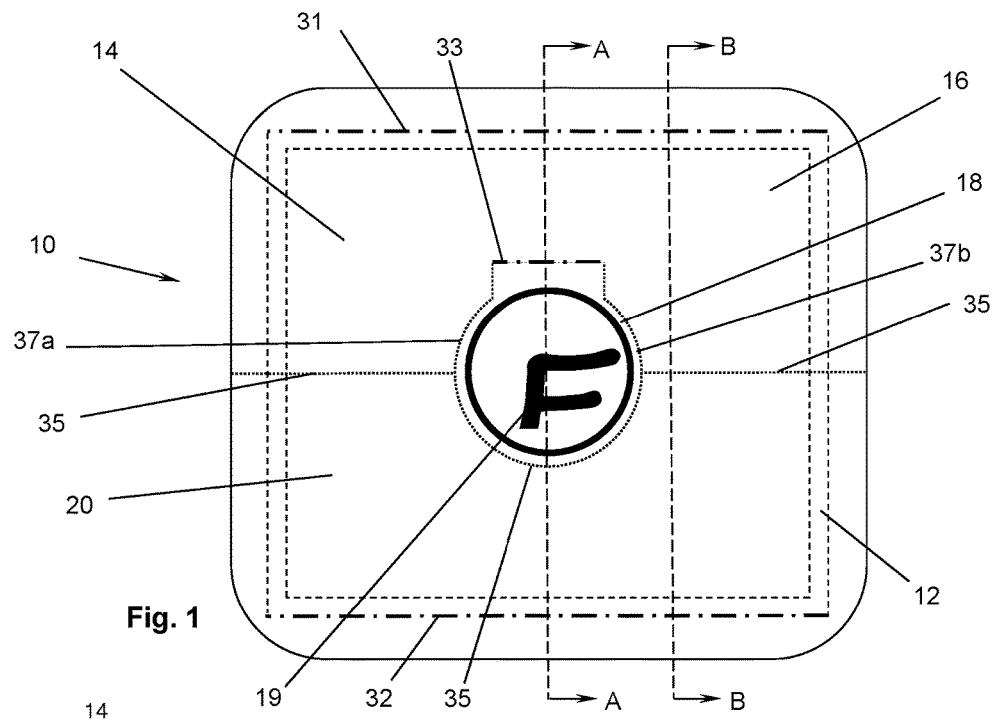
FIG. 1 shows a top view of a first exemplary embodiment of a cover element.
Figures 2, 2A:
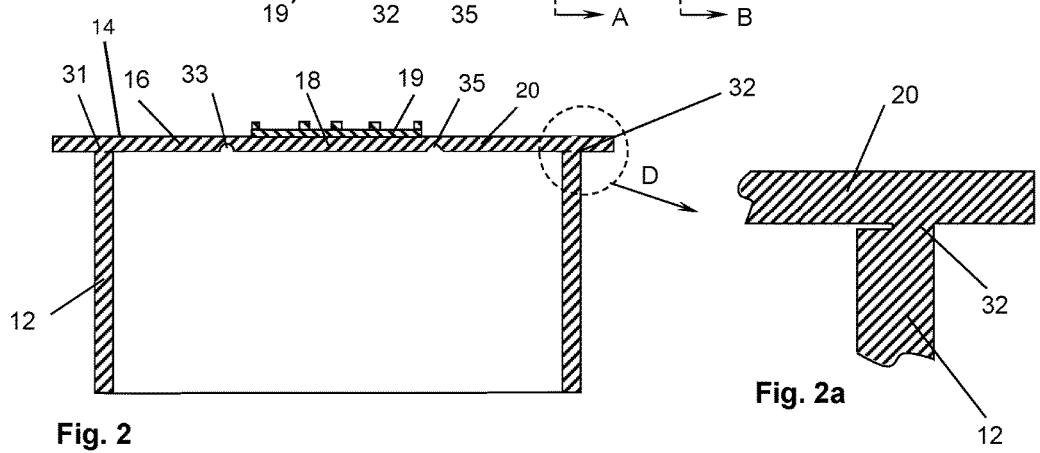
FIG. 2 shows a section along the plane A-A in FIG. 1.
FIG. 2a shows the detail D from FIG. 2.
Figure 3:
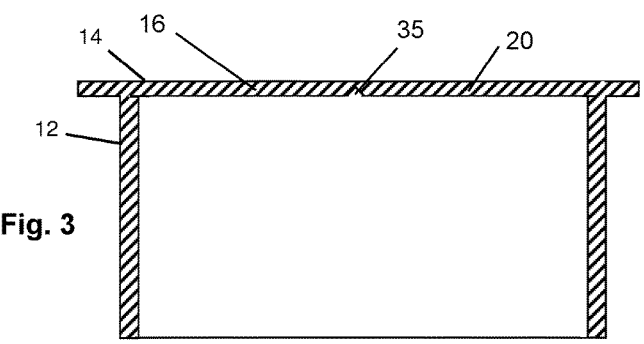
FIG. 3 shows a section along the plane B-B in FIG. 1.

FIGS. 1 to 3 show a first exemplary embodiment of a cover element, namely of a cover element 10 for a driver front airbag. It could, however, in principle be a cover element for a passenger front airbag module, in which case the cover element, like the airbag module as a whole, is usually in an elongated configuration. The same also applies to the exemplary embodiments shown in FIGS. 6 to 8.

Figure 6:
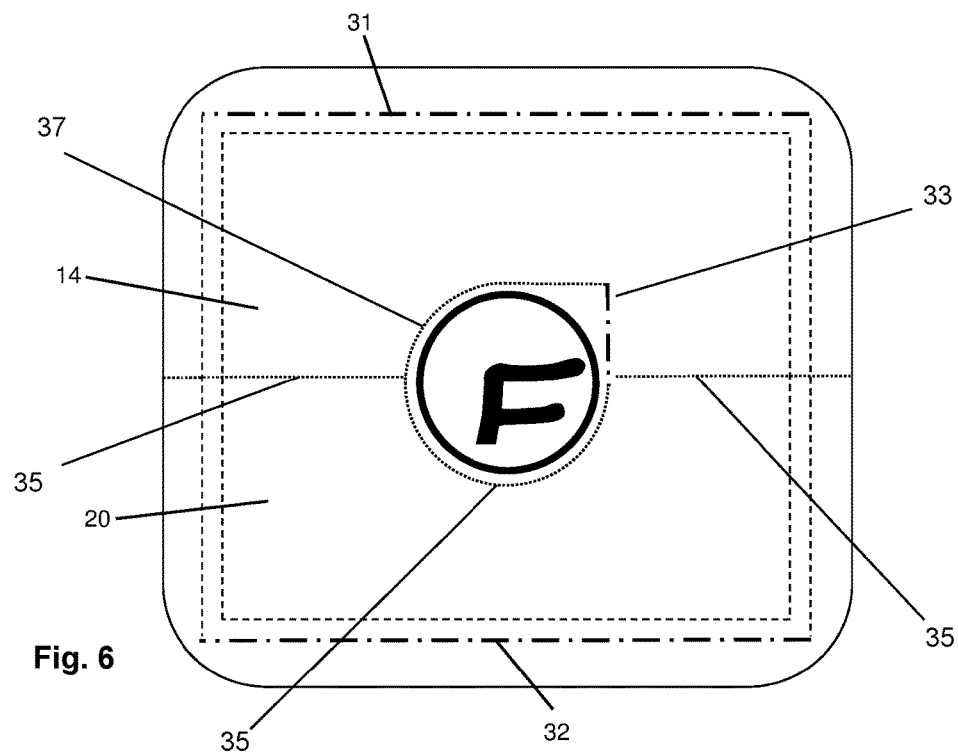
FIG. 6 shows a second exemplary embodiment of the invention in a drawing corresponding to FIG. 1.

It should further be mentioned that in the top views of FIGS. 1 and 6, all hinges are shown as thick dashed-dotted lines, and that all tear-away connections are shown as dotted lines.

The cover element 10 has, as is apparent in particular from FIGS. 2 and 3, a lateral wall 12, which holds the cover element 10 on a housing 40 when the cover element 10 is mounted, as is sufficiently known from the prior art. In the exemplary embodiment shown, the lateral wall 12 serves as a stationary section on which the two flaps 14 and 20 are each pivotally retained about hinges 31 and 32. In the first exemplary embodiment shown, the flaps 14 and 20 form the entire top of the cover element 10, which, however, is not absolutely necessary, as will be seen later with respect to the third exemplary embodiment. The lateral wall 12 and the flaps 14 and 20 can, in particular, be embodied as 1K or 2K injection molded parts. It is possible that the flaps 14 and 20 are connected to the lateral wall 12 via tear-away connections in addition to the hinges 31 and 32; this, however, is not shown in the Figures.

The first flap 14 has an outer area 16, which is connected to the lateral wall 12 via the first hinge 31 and an emblem area 18. This emblem area 18 bears an emblem 19, which can be made separately from the first flap, but is permanently connected to the emblem area 18. In the exemplary embodiment shown, the outer area 16 of the first flap 14 and the second flap 20 are essentially configured to be symmetrical, and the emblem area 18 is in turn essentially centrally disposed. This results in the emblem area 18 extending into the outer area 16 of the first flap 14, as well as into the second flap 20, as is apparent from FIG. 1.

The flaps 14 and 20 are connected to each another by a first tear-away connection 35, which also extends around an edge section of the emblem area 18.

According to the invention, the emblem area 18 is connected to the outer area 16 of the first flap 14 by a third hinge 33. Since in the first exemplary embodiment shown, the emblem area 18 also extends into the outer area 16 of the first flap 14, a second tear-away connection with two sections, 37a and 37b, is provided, which connects the emblem area 18 to the outer area 16 of the first flap. In the exemplary embodiment shown, all hinges (31, 32, and 33) are parallel to one another, which, however, is not necessary.

Figure 4:
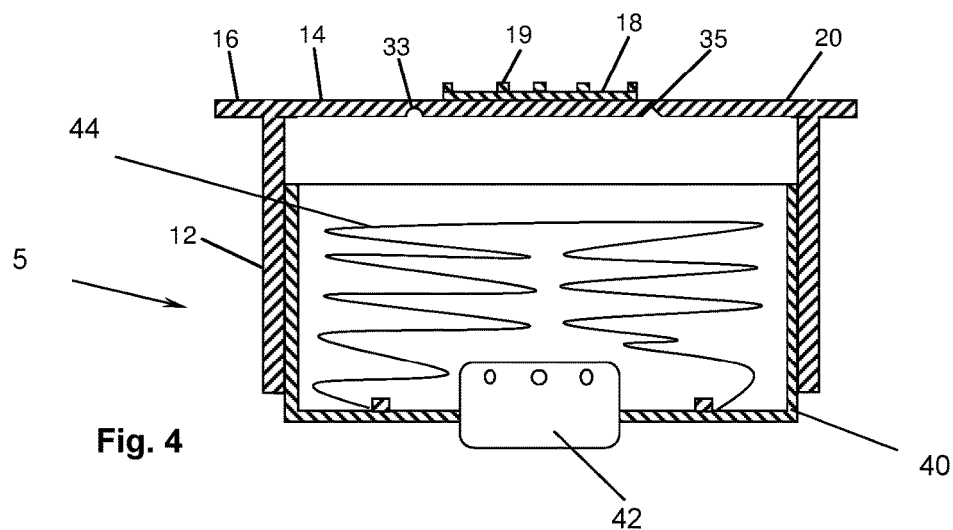
FIG. 4 shows a schematized depiction of a complete airbag module with the cover element of FIGS. 1 to 3 in a depiction corresponding to FIG. 2.
Figure 5:
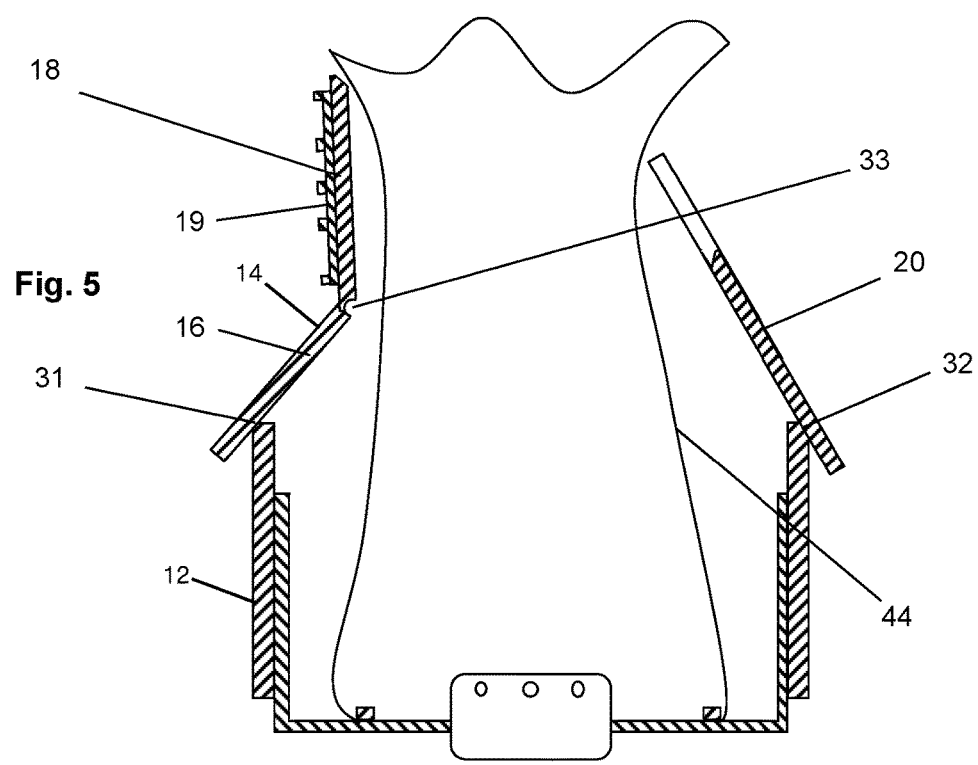
FIG. 5 shows what is shown in FIG. 4 after the expansion of the airbag.

FIG. 4 shows the cover element 10, which is mounted on a housing 40, so that an airbag module 5 is formed. If the gas generator 42 of this airbag module 5 is ignited, the airbag 44 expands and opens the two flaps, 14 and 20, as is shown in FIG. 5. As a result, all tear-away connections, 35 and 37, are broken. Furthermore, the outer area 16 of the first flap 14 folds about the first hinge 31, and the second flap 20 folds about the second hinge 32. In addition, the expanding airbag 44 swings the emblem area 19 about the third hinge 33 against the outer area 16 of the first flap, so that the airbag 44 can escape unhindered without having to destroy the emblem area 18 and, consequently, the emblem 19, while restraining the emblem from free flight within the vehicle interior.

FIG. 6 shows a second exemplary embodiment of the invention in a drawing corresponding to FIG. 1. It can be seen here that the third hinge, which connects the emblem area 18 to the outer area 16 of the first flap 14, need not be parallel to the first hinge 31 (and, obviously, not parallel to the second hinge 32 either).

Figure 7:
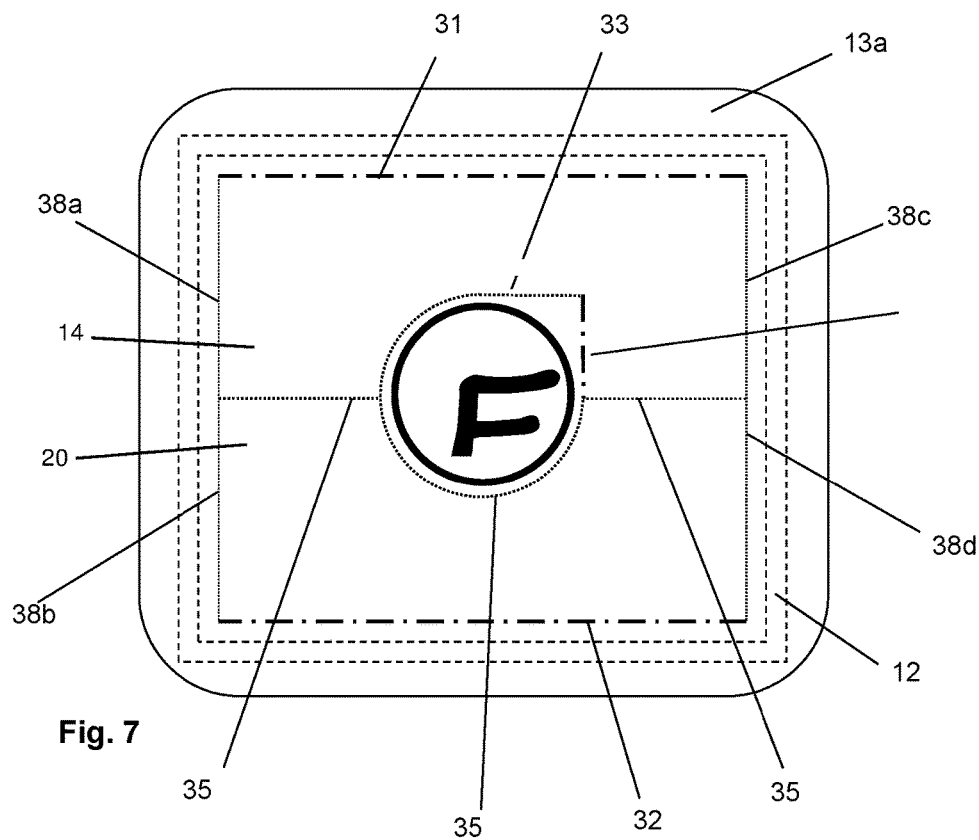
FIG. 7 shows a third exemplary embodiment of the invention in a drawing corresponding to FIG. 1.

FIG. 7 shows a third exemplary embodiment of the invention. The difference from the first two exemplary embodiments is that the two flaps, 14 and 20, do not form the entire top of the cover element 10, but rather that the cover element has a peripheral area 13a, which, for example, can be permanently and rigidly connected to the lateral wall 12 (as far as available). In this case, further tear-away connections 38a, 38b, 38c and 38d are provided, which connect the flaps 14 and 20 to this peripheral area 13a.

Figure 8:
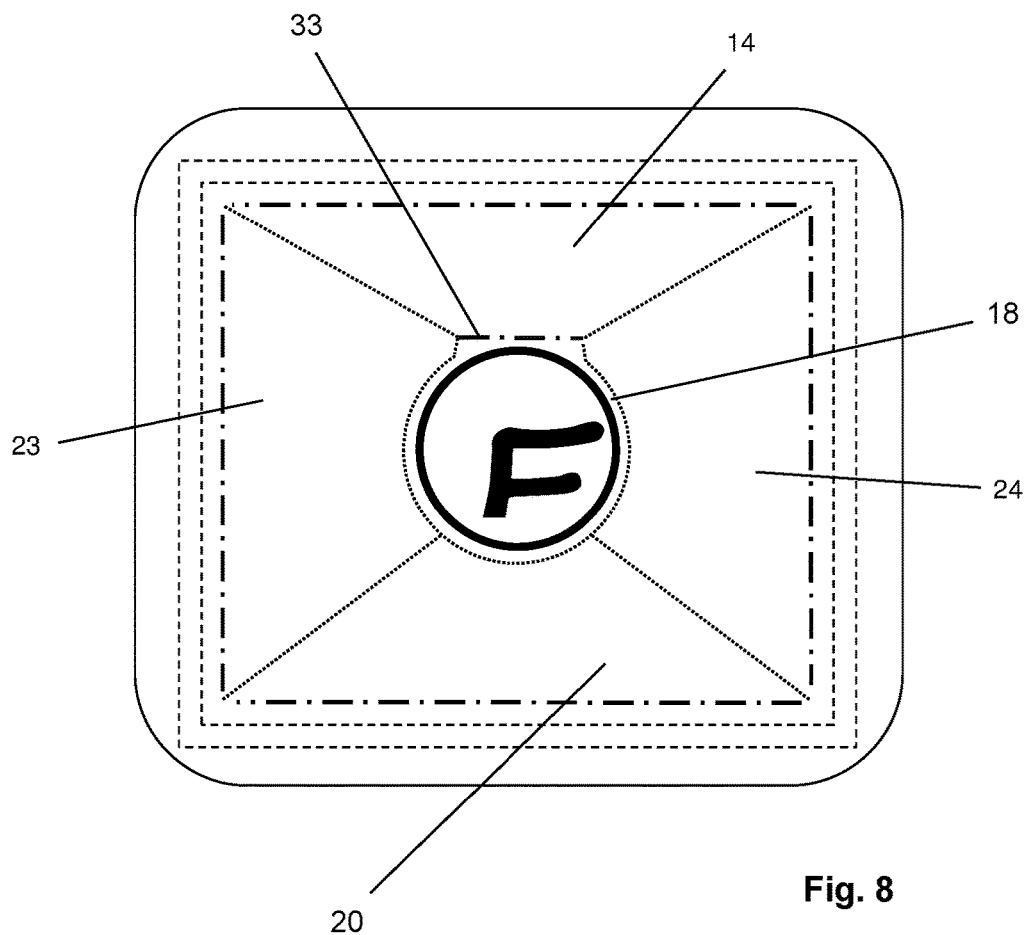
FIG. 8 shows a fourth exemplary embodiment of the invention in a drawing corresponding to FIG. 1.

FIG. 8 shows an exemplary embodiment having more than two flaps, namely the four flaps 14, 20, 23, and 24. Here it is possible that the emblem area is exclusively connected to the outer area 16 of the first flap 14 via a hinge (third hinge 33) but not via a tear-away connection.

While the above description constitutes the preferred embodiment of the present invention, it will be appreciated that the invention is susceptible to modification, variation and change without departing from the proper scope and fair meaning of the accompanying claims.

The invention claimed is:

1. A cover element for an airbag unit, the cover element comprising a stationary section, a first flap and a second flap, wherein the first flap is connected to the stationary section by at least one first hinge, and the second flap is connected to the stationary section by at least one second hinge,
   wherein, in an initial state in which the airbag unit is undeployed, the first and the second flaps are connected to each other by a first tear-away connection,
   wherein the first flap has a first outer area and an emblem area, which protrudes at least partially from the outer area and extends into the second flap and is connected to the second flap via the first tear-away connection,
   wherein the emblem area is connected to the outer area of the first flap by a third hinge extending non-parallel to the first hinge and by a second tear-away connection, so that the emblem area can swing against the outer area when the first flap is open upon a deployment of the airbag unit.

2. The cover element according to claim 1, further comprising an emblem disposed on the emblem area.

3. The cover element according to claim 1, wherein the stationary section includes a lateral wall.

4. A cover element according to claim 1, wherein only the first and the second flaps are provided.

5. A cover element according to claim 4, wherein the first and second flaps form an entire top of the cover element.

6. A cover element according to claim 1, further comprising a third flap in addition to the first and the second flaps.

7. An airbag module having a housing with an outlet opening, a gas generator held on the housing, an airbag folded into the housing, and a cover element in accordance with claim 1.

* * * * *